United States Patent
Chen et al.

(10) Patent No.: US 12,089,732 B2
(45) Date of Patent: Sep. 17, 2024

(54) SYSTEM FOR DETECTING USAGE AND POSITION OF A HEIGHT ADJUSTABLE WORK SURFACE

(71) Applicants: Xinadda Inc., San Jose, CA (US); Dexatek Technology Ltd, New Taipei (TW)

(72) Inventors: Han Chen, Taipei (TW); Yueh-Chen Lin, London (GB); Manuel Alejandro Gomez De Los Santos, Valencia (ES); Hsin-Yu Chen, Taipei (TW)

(73) Assignees: XINADDA, INC., San Jose, CA (US); DEXATEK TECHNOLOGY LTD., New Taipei (TW)

( * ) Notice: Subject to any disclaimer, the term of this patent is extended or adjusted under 35 U.S.C. 154(b) by 439 days.

(21) Appl. No.: 17/369,278

(22) Filed: Jul. 7, 2021

(65) Prior Publication Data

US 2023/0009393 A1 Jan. 12, 2023

(51) Int. Cl.
| | |
|---|---|
| *A47B 21/02* | (2006.01) |
| *A47B 9/20* | (2006.01) |
| *G06F 11/30* | (2006.01) |
| *G06F 11/34* | (2006.01) |
| *H04W 4/80* | (2018.01) |

(52) U.S. Cl.
CPC ............... *A47B 21/02* (2013.01); *A47B 9/20* (2013.01); *G06F 11/3058* (2013.01); *G06F 11/3438* (2013.01); *H04W 4/80* (2018.02); *A47B 2200/0021* (2013.01); *A47B 2200/0062* (2013.01); *A47B 2200/0081* (2013.01)

(58) Field of Classification Search
CPC .............. A47B 9/20; A47B 2200/0021; A47B 2200/0062; A47B 2200/0081; A47B 21/02; G06F 11/3058; G06F 11/3438; H04W 4/80
See application file for complete search history.

(56) References Cited

U.S. PATENT DOCUMENTS

| | | | |
|---|---|---|---|
| 10,021,530 B2 * | 7/2018 | Sigal ..................... | H04W 4/029 |
| 11,918,116 B1 * | 3/2024 | Labrosse ............... | G05B 19/406 |
| 2017/0013415 A1 * | 1/2017 | Sigal ..................... | H04W 8/005 |
| 2021/0150213 A1 * | 5/2021 | Hansen .................. | A47B 9/00 |

FOREIGN PATENT DOCUMENTS

| | | | |
|---|---|---|---|
| CA | 3060906 A1 * | 5/2020 | |
| EP | 3926556 A1 * | 12/2021 | ............. A47B 13/00 |

\* cited by examiner

*Primary Examiner* — Crystal J Barnes-Bullock
(74) *Attorney, Agent, or Firm* — Douglas E. Warren (57) ABSTRACT

A system for detecting usage and position of a height adjustable work surface is disclosed that includes a smart hub device that uses a set of sensors to collect sensor data to determine whether a work area is occupied or unoccupied, and to also collect work area usage data for further analysis regarding the details of usage of the work area.

14 Claims, 7 Drawing Sheets

SYSTEM FOR DETECTING USAGE AND POSITION OF A HEIGHT ADJUSTABLE WORK SURFACE

CROSS REFERENCE TO RELATED APPLICATIONS

Not applicable.

STATEMENT REGARDING FEDERALLY SPONSORED RESEARCH

Not applicable.

BACKGROUND OF THE INVENTION

Most users of desks and other work surfaces spend too much time sitting or standing. This remains true even when they have a standing desk because it isn't easy for the user to get used to creating standing-sitting cycles in a busy day. As a result, the user spends too much time standing because they simply forget to sit down.

The past versions of a System for Detecting Usage and Position of a Height Adjustable Work Surface have created a number of usability issues for the users of the system. One major issue was the inability of users to become comfortable with occasionally changing the height positions of the work surface throughout the day to prevent the user from standing or sitting too long. This resulted in a general inability for the users to get the full advantage of those previous systems.

Additionally, the design and usage of those previous versions failed to achieve their desired goals for various reasons, including: (1) earlier versions did not provide a universal solution to the problem that could be used in conjunction with various types of desks and works surfaces rather than a single model; (2) earlier versions were specifically designed to work only with electrically operated desks and work surfaces, thus preventing those earlier systems from being used with other non-electric types of work surfaces; (3) earlier versions had adaptability problems that made those earlier systems unsuitable for small offices or home office use because they required a separate central or base station device in order to connect to the Internet to allow full near and remote functionality of the earlier systems; (4) data retrieval for usage and operation of the earlier systems was deficient because the previous versions failed to individually connect to the Internet to allow the remote retrieval of any usable data; (5) the earlier systems lacked a smart hub gateway feature to allow pairing supported BLE peripheral devices to the system, thus making it impossible to scale beyond their current hardware function of the earlier systems; and, (6) the earlier systems were very inaccurate at detecting sudden changes in human presence and prolonged human presence using the earlier systems.

It would be desirable to have a system that allows users to track their height adjustable desk usage and motivates users to achieve their wellness goals by encouraging them to stand up or sit more often and create healthy position cycles by overcoming the problems and negative issues related to the earlier versions of height adjustable work surface system.

SUMMARY OF INVENTION

This section provides a general summary of the disclosure, and is not a comprehensive disclosure of its full scope or all of its features.

Various embodiments of the present invention provide a system for detecting usage and position of a height adjustable work surface. More specifically, certain embodiments of the present invention include a smart hub device that can be installed below any height adjustable desk or work surface (electric, crank, or pneumatic/lever). The smart hub device tracks the height and occupancy rate of the desk or work surface. This information can be sent to the Cloud using Wi-Fi which can then be linked to a central database device to see if a person has been sitting or standing at the desk or work surface, and for how long. It is understood by those of skill in the art that the use herein of the term "Cloud" herein refers to a network of remote servers hosted on the Internet and used to store, manage, and process data in place of local servers or personal computers.

In accordance with the various embodiments of the present invention, this invention relates to a system for detecting usage and position of a height adjustable work surface that incorporates an advanced algorithm and a set of sensors in conjunction with a gateway smart hub feature.

Various embodiments of the present invention also provide a universal/scalable solution that allows the system to detect usage and position of a height adjustable work surface that is workable with desks and work surfaces in which the height of the desk or work surface can be either electrically or manually adjusted. Yet other embodiments of the present invention can provide at least one of either enhanced user detection accuracy to detect a human user of the desk or work surface, a smart hub device feature where supported Bluetooth Low Energy (BLE) devices can connect to the present system that allows it to be used interactively by connecting to other BLE supported devices, a system to detect usage and position of a height adjustable work surface usable in either commercial office or home office settings, and doesn't require persistent BLE communications to a phone system.

DESCRIPTION OF THE DRAWINGS

In the accompanying drawings which form part of the specification.

Corresponding reference numerals indicate corresponding steps or parts throughout the several figures of the drawings.

While specific embodiments of the present invention are illustrated in the above referenced drawings and in the following description, it is understood that the embodiments shown are merely some examples of various preferred embodiments and are offered for the purpose of illustration only, and that various changes in construction may be resorted to in the course of manufacture in order that the present invention may be utilized to the best advantage according to circumstances which may arise, without in any way departing from the spirit and intention of the present invention, which is to be limited only in accordance with the claims contained herein.

DETAILED DESCRIPTION OF AT LEAST ONE PREFERRED EMBODIMENT OF THE INVENTION

In the following description, numerous specific details are set forth such as examples of some preferred embodiments, specific components, devices, and methods, in order to provide a thorough understanding of embodiments of the present disclosure. It will be apparent to a person of ordinary skill in the art that these specific details need not be exclusively employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill.

Various embodiments of the present invention provide a system for detecting usage and position of a height adjustable work surface. More specifically, certain embodiments of the present invention include a smart hub device that can be installed below any height adjustable desk or work surface (electric, crank, or pneumatic/lever). The smart hub device tracks the height and occupancy rate of the desk or work surface, as well as other information about the occupancy of the work area upon which the smart hub device has been installed. This information can be sent to the Cloud using Wi-Fi that can then be linked to a central database device to see if a person has been sitting or standing at the desk or work surface and for how long.

The various operating functions of the smart hub device when combined with other system functions as defined herein include at least the several general functions. First, the smart hub device can gather data at a specific work area to evaluate whether a user sufficiently alternates between standing positions and sitting positions while performing tasks at that work area and remind the user to alternate between positions. Second, the smart hub device can accumulate and generally analyze various forms of data related to the general usage of the work area such as the exemplary categories of overall occupancy rate of the work area by day-hour-minute and the usage rate of their height adjustable desk asset. Third, the smart hub device can generate various functional commands that can arrange or adjust the states of the various positions and controls related to the work area, such as, for example, turning on the fan for that work area whenever the smart hub device senses that the work area has been occupied by a user. Fourth, the smart hub device can generate analytical mapping of the usage of a work area to identify certain mapping and office occupancy data. And, finally, the occupancy rate of a work area that has been allocated to a user's home for working at home through remote work systems can be generated.

At least one preferred embodiment of the present invention is illustrated in the drawings and figures contained within this specification. More specifically, certain preferred embodiments of the present invention are generally disclosed and described in FIGS. 1-9.

In the present embodiment of a System for Detecting Usage and Position of a Height Adjustable Work Surface, the system generally comprises a smart hub device, a user interface for generally configuring the smart hub device for operation for a specific work area, capabilities to connect the smart hub device to external Bluetooth peripherals, and capability to communicate certain data collected by the smart hub device to the Internet or Cloud.

Figure 1:
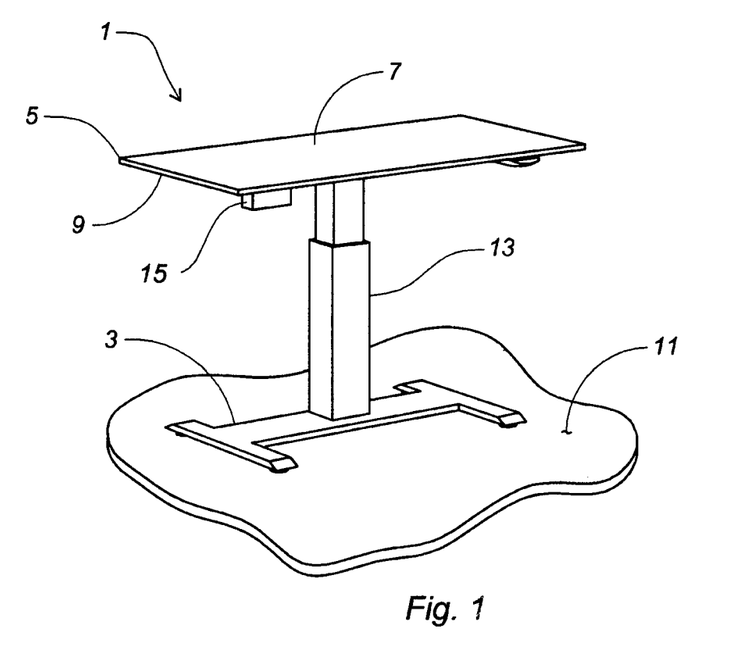
FIG. 1 is a perspective view of one embodiment of the present invention.

Referring now to FIG. 1, the present embodiment of a System for Detecting Usage and Position of a Height Adjustable Work Surface is shown as shown. In this embodiment, the work area 1 includes a work table 3 having a work surface 5 that has an upper surface 7 and a lower surface 9. The height of the work surface 5 above a floor 11 upon which the work table 3 is disposed can be increased or decreased by activation of a height adjustment system 13. It is understood that a smart hub device 15 in this embodiment is disposed on the lower surface 9 of the work surface 5 to allow the smart hub device to have a view of the floor 11 upon which the work table 3 is disposed.

Figure 2:
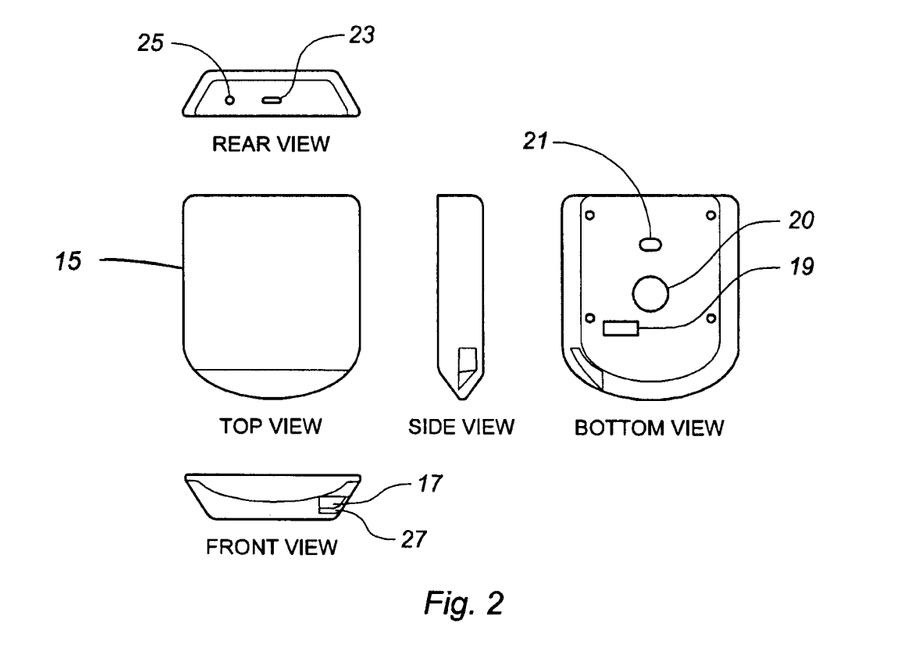
FIG. 2 is a view of one embodiment of a smart hub device of the present invention.

FIG. 2 shows one configuration of the smart hub device 15 as used within the present embodiment of a System for Detecting Usage and Position of a Height Adjustable Work Surface. In this embodiment, the smart hub device 15 comprises a first sensor 17 capable of detecting data related to the presence of a user of the work area, a second sensor 19 for detecting ambient temperature of the space which the work area is located, and a third sensor 21 for detecting the height between the lower surface 9 of the work surface 5 and the floor 11. It is noted that in yet other embodiments of the invention the use of less than two IR sensors may be used to more generally determine the presence of a user at the work table depending upon the environment and specific application of the embodiment used.

It is noted that previous inventions related to embodiments of the present invention often had difficulty in detecting the presence of a user at a work table and detecting the continued presence of a user remaining at the work table. Various embodiments of the current invention addressed that problem by coordination and analysis of data communicated to the present system that has been collected by two separate infrared detectors.

More specifically, the first sensor 17 in this embodiment is an InfraRed (IR) type sensor and is used to detect and/or measure the human temperature and detect motion of a user that is occupying the work area 1. It is understood that the first sensor 17 is generally located at the Front View (FIG. 2) of the smart hub device 15 and is positioned to face toward the area in which the user will normally be residing as the user is working at the work area 1. This forward facing of the first sensor 17 will provide the best opportunity for the first sensor to accurately detect the presence of the user and the proper incorporation of the occupancy and timing of the presence of the user's presence at the work area 1.

The second sensor 19 detects the ambient office temperature in which the work area 1 is located. In this embodiment that ambient temperature data is used to calibrate the information collected from the first sensor 17 to assist in the increase of the occupancy detection accuracy during prolonged human presence (i.e. sitting for hours) and can better cope with environment temperature changes. It is understood that the second sensor 19 is generally located on the bottom of the smart hub device 15 and is shown in the Bottom View of FIG. 2. It is understood that the second sensor 19 is positioned to face the floor 11 in which the work table 3 is placed. It will be appreciated by those of skill in the art that this floor-facing positioning of the second sensor 19 will provide a good detection of the ambient temperature of the location of the work area 1.

It is noted that the present embodiment of this invention uses part number AK9750 IR sensor from Asahi Kasei Microdevices for each of the first sensor 17 and the second sensor 19. It is appreciated that any other sensor can be used and remain within the scope of the invention as long as the alternate microdevice selected can perform the same functions and operation as described and required herein, The third sensor 21 is a Time of Flight (TOF) sensor intended to provide data for the general determination related to a height dimension for the distance between the smart hub device 15 and the floor 11 upon which the work table is positioned. In the present embodiment, the third sensor 21 is located on the bottom of the smart hub device 15 and is shown in the Bottom View of FIG. 2.

It is noted that the current embodiment of the smart hub device 15 incorporates a USB port 23 for the provision of power to the smart hub device. The USB port 23 of this embodiment is shown in the Rear View of FIG. 2. It is also additionally noted that the smart hub device 15 incorporates a reset control 25 for resetting all or portions of the System for Detecting Usage and Position of a Height Adjustable Work Surface.

An LED indicator 27 in shape of L is incorporated into the smart hub device 15 to give indications to the user of system connectivity, changes in work area 1 occupancy status, pairing status of one or more work areas, and any other connectivity and power issues that may effect the function and operation of the present invention.

It is understood that the smart hub device 15 of the present embodiment can installed onto the lower surface 9 of the work surface 5 using any means that secures the smart hub device to the lower surface in a manner that generally prevents the smart hub device from being loosely installed.

It is understood that the smart hub device 15 of the current embodiment also has a Bluetooth Low Energy (BLE) interface. The BLE Interface is generally used during setup and connection of the System for Detecting Usage and Position of a Height Adjustable Work Surface to provide for the connection and pairing of the smart hub device with any application disposed within a related device desired to be connected to the smart hub device. The user initiates pairing of the smart hub device 15 with various BLE interface devices by momentarily activating a pairing device 20 on the BOTTOM VIEW of the smart hub device as shown in FIG. 2. In this particular embodiment, the pairing device 20 is a button. Other specific activating devices may be used and remain within the intended scope of the present invention. During the BLE pairing process, the indicator 27 is activated to indicate the process status and to show when the process has been completed and BLE devices have been successfully paired with the smart hub device.

As noted herein, the smart hub device 15 collects certain Occupancy Data 29 related to the use of the work area 1. That collected Occupancy Data 29 may then be transmitted to another electronic device by the transmission of the collected Occupancy Data 29 to a remote device though the Cloud. This type of data transmission allows embodiments of the present invention to function substantially without a remote application after an embodiment of the invention has been installed and initiated. The smart hub device 15 also uses the BLE interface to act as a hub to allow the smart hub device to provide communications between the smart hub device and other supported BLE peripheral devices. That inter-communication function allows the smart hub device 15 to connect supported smart devices to the Internet via the smart hub device therefore enabling the possibility to further extend the functionality of the operations and functions of embodiments of the present invention into other sensor systems directly from the smart hub device.

It is understood that the smart hub device 15 utilizes a variety of commonly available electronic and electrical components such as connectors, printed circuitry microprocessors. As such, it is also understood that that those components and the microprocessor commonly function when a software package has been installed onto the microprocessor. It is noted that the smart hub device 15 also incorporates a software package that enables the system to interconnect, transmit data, and generally function as described herein. Therefore, any type of electronic components, software, and software language can be used and remain within the scope of the present invention as long as the software package, format, content, and language selected allows the smart hub device 15 to function and operate as described herein.

Figure 5:
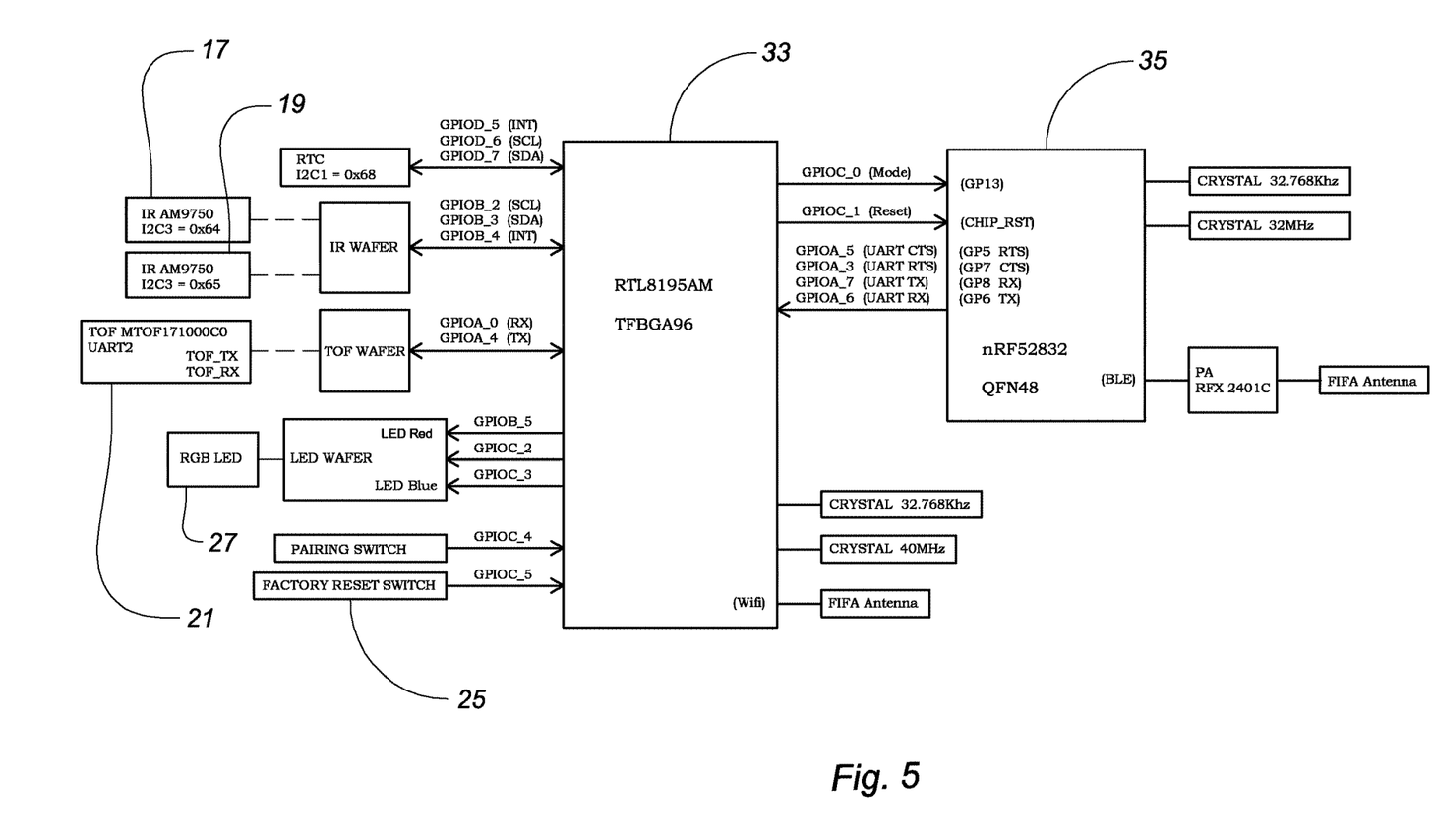
FIG. 5 is a block diagram showing the primary electrical components of one embodiment of the smart hub device.
Figure 6:
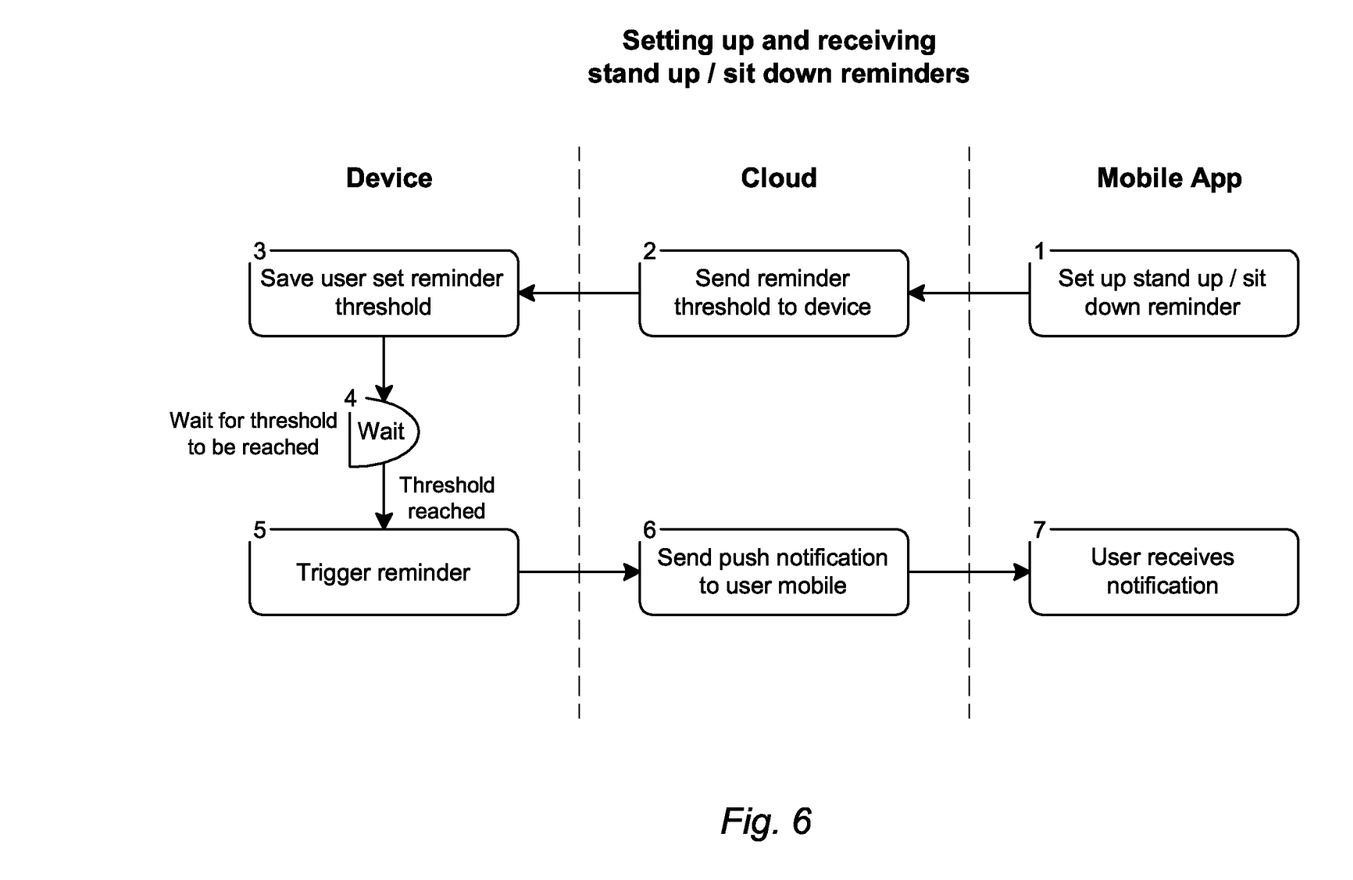
FIG. 6 is a diagram to describe a method of setting up and receiving stand up/sit down reminders to the user of one embodiment of the present invention.

FIG. 5 is a block diagram that disclose certain primary electronic components such as the primary microchip 33, the Bluetooth microchip 35, the first sensor 17, the second sensor 19, the third sensor 21, the reset control 25, and the LED indicator 27. It is understood that other types of electronic components may also be used for the smart hub device 15 and remain within the intended scope of the present invention as long as the alternate electronic components selected can perform the general operations and functions as noted herein for the various embodiments of the present invention.

After the physical installation of the components of an embodiment of the present invention as disclosed herein, the embodiment is ready to commence its operations and functions. The general operation of an embodiment of the present invention is disclosed by FIG. 3 and FIG. 4.

Once installed on the lower surface 9 and connected to an appropriate electrical power source, the smart hub device 15 starts operating. In the present embodiment, the user activates a smart phone application to setup the smart hub device 15 and the Wi-Fi connection of the smart hub device, via the BLE interface of the smart hub device. During this setup, the smart hub device 15 establishes the user of the work area 1 by setting up a unique user account designation within the communication system of the embodiment of the present invention.

Figure 3:
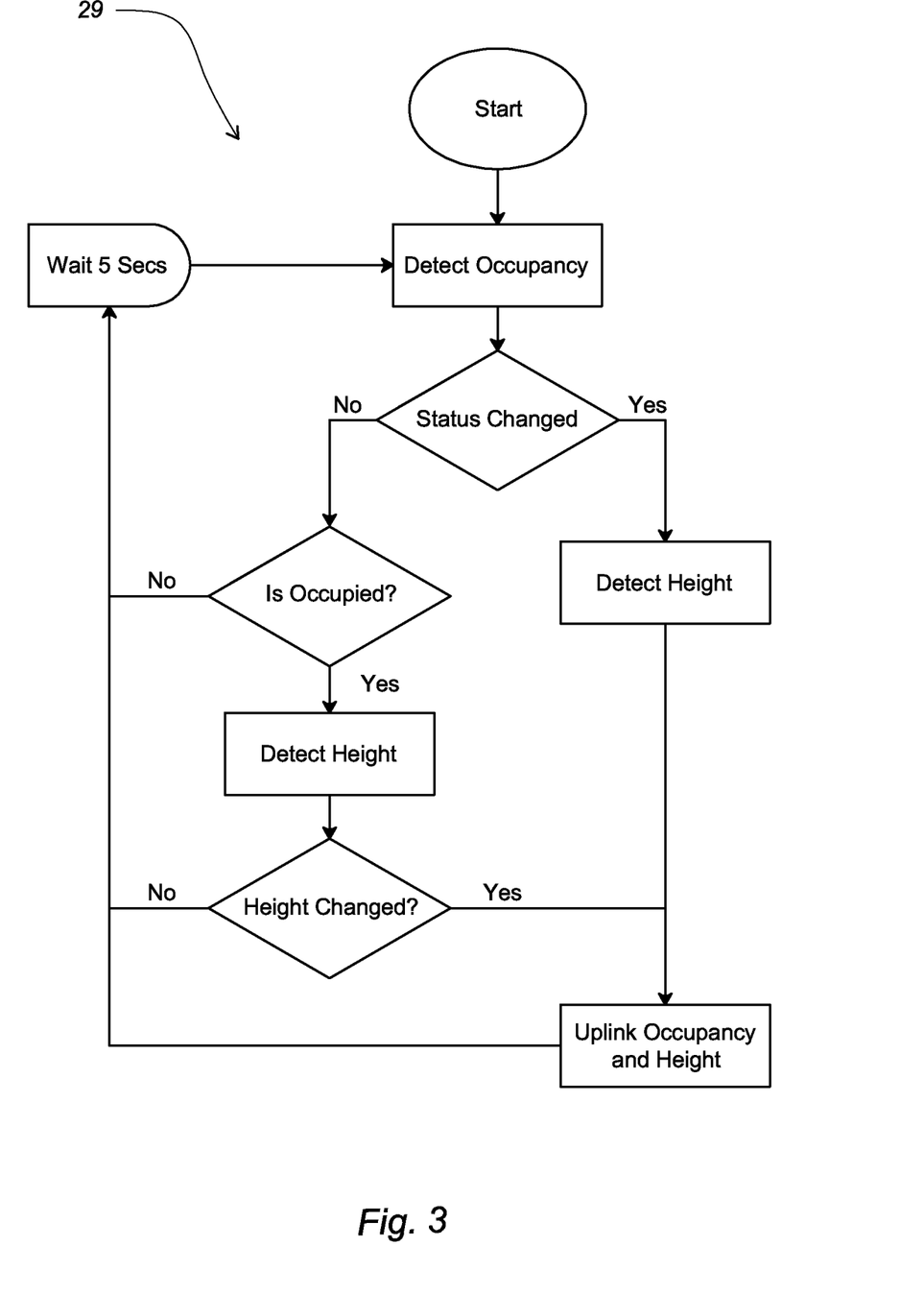
FIG. 3 is a flow chart showing the internal software functions of the smart hub used in one embodiment of the present invention.

More specifically, FIG. 3 shows a flow chart that generally depicts the process used by the smart hub device 15 for detecting occupancy uses both the first sensor 17 and second sensor 19 to determine whether the work area 1 is occupied or unoccupied. After the data from the sensors 17 and 19 has been analyzed by the smart hub device 15, the status of the values of the combined data collected by the sensors is then compared to the previously sensed and stored data by those sensors. If the new set of data is not the same as the previously stored data, then the smart hub device 15 will conclude that the occupancy status (sitting, standing, or empty) of the work area 1 directly related to the installed smart hub device has changed. That new occupancy status is then stored with the smart hub device 15 and, if so instructed, the smart hub device will uplink the new occupancy status to remote electronic devices for use, storage, and analysis.

As noted above, the present embodiment detects the presence of a user at a work table and the continued presence or absence of a user at that same table. The process by which these determinations are made are disclosed in the following.

Figure 7:
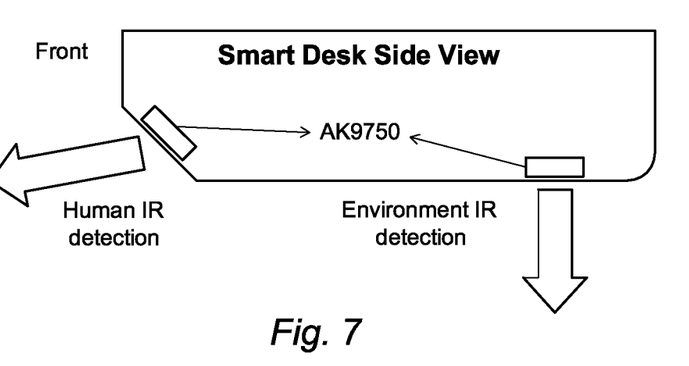
FIG. 7 is a diagram showing the general orientation of the first sensor and the second sensor within the smart hub device in one embodiment of the present invention.

Referring now to FIG. 7, a schematic side view of the smart hub device 15 is provided to show the location and usage of the first sensor 17 and the second sensor 19. The first sensor 17 generally faces toward the FRONT VIEW of the smart hub device 15 and one of the uses of the first sensor is to detect the present of a human user by detecting infrared energy emanating from the user's human body. Detection of such infrared energy is interpreted by the smart hub device 15 as being the presence of a human user. The second sensor 19 generally faces downward toward the BOTTOM VIEW of the smart hub device 15. One of the uses of the second sensor 19 is to detect the infrared energy of the environment in which the work table 3 resides. The software package of the smart hub device 15 receives signals from the first and second sensors 17 and 19 and then analyzes the infrared signals to determine either the presence and or the continued presence of a human user.

In operation, the general theory for the detection of a human user at the work table 3 requires the detection of two IR signals from two separate sensors and a comparison of the difference between these signals to an upper threshold or a lower threshold used respectively, to determine the presence or absence of a human. It is noted that the signals and data provided by the first and second sensors 17 and 18 are processed with a moving average filter to generally reduce any signal noise coming from the two sensors. This process is generally disclosed in FIG. 8.

It is first understood that the high level of temperature sensitivity of the components used as the first and second sensors 17 and 19 requires that the temperature within which the work area 1 is located must first be stable enough for the sensors 17 and 19 to be able to provide meaningful signals to the smart hub device 15. Therefore, the present embodiment allows for about a 10-minute smart hub device 15 warm up period to allow the temperature inside the casing for the smart hub device and the temperature around the smart hub device to stabilize sufficiently for more accurate operation of the smart hub device.

After the temperature stabilization period is compete, the determination that a user is present at the work table 3 is made by comparing the IR signal indicated from the front facing first sensor 17 and the IR signal indicated from the down facing second sensor 19. The presence detection is generally accomplished through use of a hysteresis comparator with an upper and a lower threshold. In this manner, the input of the detection is the difference between the signal from the first sensor 17 signal and the signal from the second sensor 19.

Figure 8:
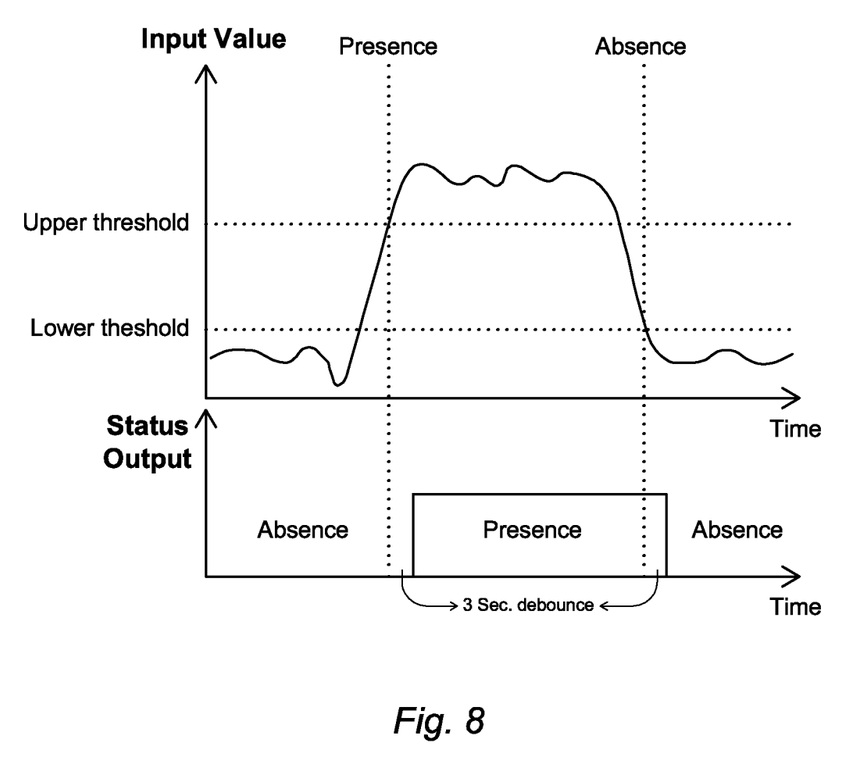
FIG. 8 is a graph showing one example of the general process of determining the human presence or absence state depending on the input value (the difference between human IR signal and environment signal) falling within a upper or lower threshold; and, FIG. 9 is a flow diagram showing the general process to calculate use and update an initial threshold that is used to detect an absence or presence state.
Figure 9:
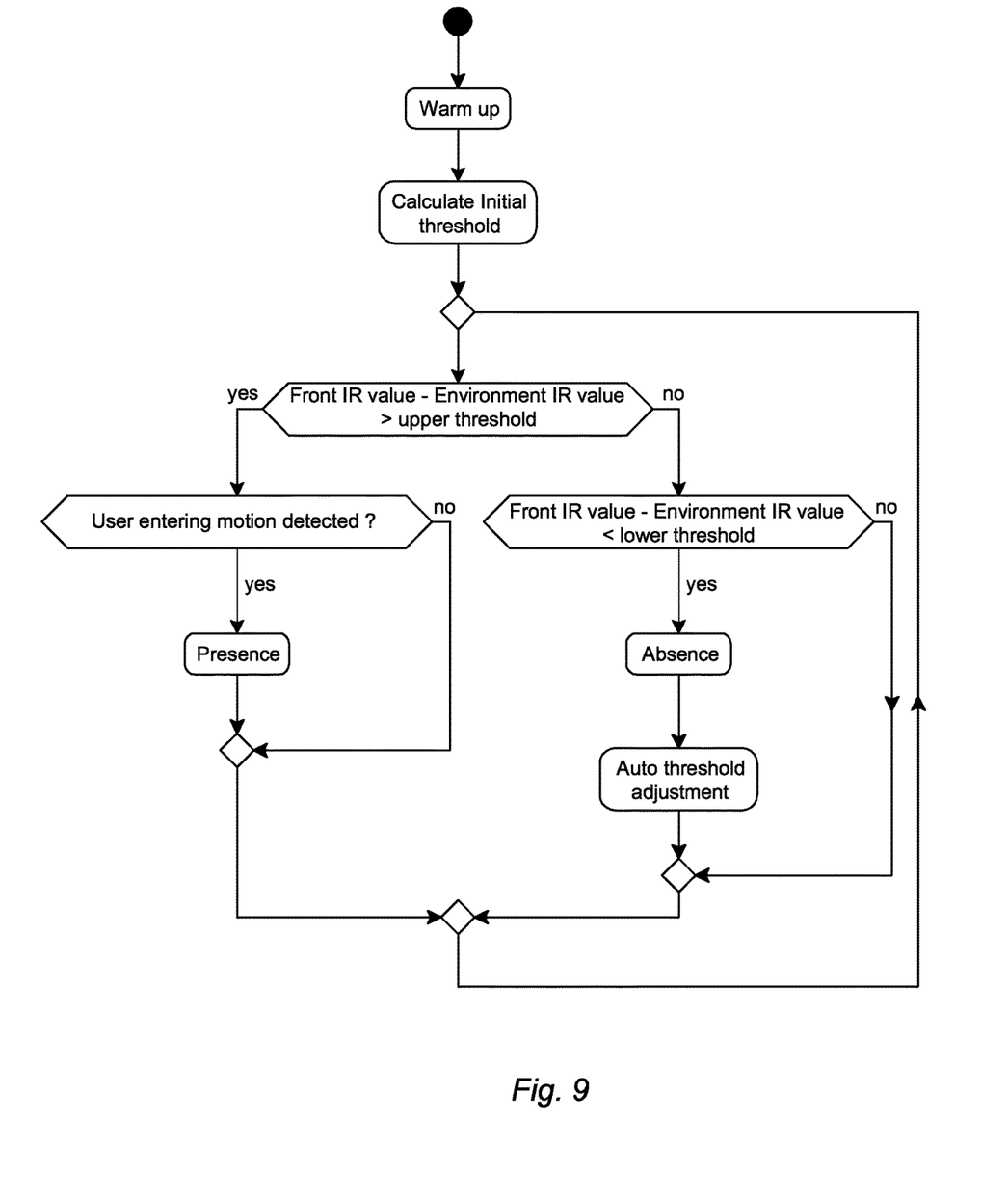

The determination of human presence begins with an initial threshold calculation that will serve as a threshold to classify the input of the detection into presence or absence state. This initial threshold is generally shown in FIG. 8. The process includes completing the warm up period for the smart hub box 15 as noted above, waiting for the input signal from the first sensor 17 to become stable, ensuring that there is no human presence within the detection range of the first sensor 17, calculation of the sensor between by the signals from the first sensor 17 and the signals from the second sensor 19, collection of a 30 second interval worth of those calculated sensor infrared signal differences and then calculating the average of those differences across that thirty second period, and then establishing that averaged sensor signal difference as the baseline from where the upper and lower threshold values are calculated by adding an empirically found fixed value to this baseline.

It will be appreciated that over time slight changes to the temperature of the human user and to the general environment for the work table 3 can occur. Therefore, the current embodiment also includes an automatic threshold temperature adjustment to detect and compensate for those infrared signal variances. More specifically, when the smart hub device 15 has determined that the status at the work area 1 is that there is an absence of a human user, a recalibration process occurs at about one-minute intervals after the detection of that absence is made and that process is generally a repetition of the initial threshold calculation noted above. It is noted that during recalibration, it is not required that the user stay out of the range of first sensor 17 because the recalibration process happens only after it has already been determined that there is no human presence (that is; absence status). It is also noted that in the present embodiment, the initial threshold calculation repeats every 5 minutes during the absence state, and ignores sudden environment changes.

After determination of the initial threshold calculation, the signals from the first and second sensors 17 and 19 are analyzed to identify signals that suggest there is human motion occurring within the range of the first sensor. This is determined in the present embodiment by comparison of a sequential set of signal inputs from the first sensor 17. This is to say, the difference between the value of a first signal from the first sensor 17 and the next following signal from the same first sensor is calculated to determine if there are differences between those two sequential signals. If differences are detected between those two sequential signals, the smart hub device 15 interprets that difference as "movement" of a human user within the sensor detection range of the first sensor 17.

To ensure proper evaluations, the determination that a human is present at the work table 3 will be made and used by the smart hub device 15 only if the infrared signal indicated by the first sensor 17 is greater than the upper threshold (FIG. 8) and there is a large "movement" motion detected (i.e. user enter the detecting area) by the first sensor as noted above. Additionally, a 3-second debounce is applied to the indicated temperature when presence/absence status of a human user changes.

In further operation, the smart hub device 15 also detects the height of the work surface 5 of the work area 1 at which the smart hub device 15 has been installed. This is done by collecting data from the third sensor 21 that provides data for the determination of the current height from the smart hub device 15 to the floor 11 and then use the process below to determine if the user is standing or sitting at the work area 1.

The smart hub device 15 analyzes the resulting inputs from the first sensor 17, the second sensor 19, and the third sensor 21 to determine whether the work area 1 is unoccupied, occupied, standing, or sitting. Referring to FIG. 3, it is first noted that the 5 second waiting delay noted therein is provided in the current embodiment just to assist in the process clarity for the present electronic and software embodiments. In yet other embodiments, the delay may be greater or less than 5 seconds and still remain within the scope of the present invention.

In the present embodiment, the height detected by the third sensor 21 is used by the smart hub device 15 to determine whether the user is standing or sitting. More specifically, the smart hub device 15 includes a customizable set of parameters which determine the user is sitting whenever the third sensor 21 detects a height of about 70 cm, and that the user is standing when the third sensor detects a height of about 100 cm. In other words, the smart hub device 15 can be preset to use those values for identifying the usual desk height for sitting and standing positions respectively. That set of values is customizable, however, and that customizable property allows smart hub device 15 to be set at other values to allow different users to use different height chairs and stools without affecting detection performance.

Thus, the third sensor 21 outputs a distance value x from the floor 11 to the third sensor. The smart hub device 15 compares the x value with the customized preset sitting, standing parameters pre-established within the smart hub device. How close x is to either value determines the resulting sitting or standing status.

Figure 4:
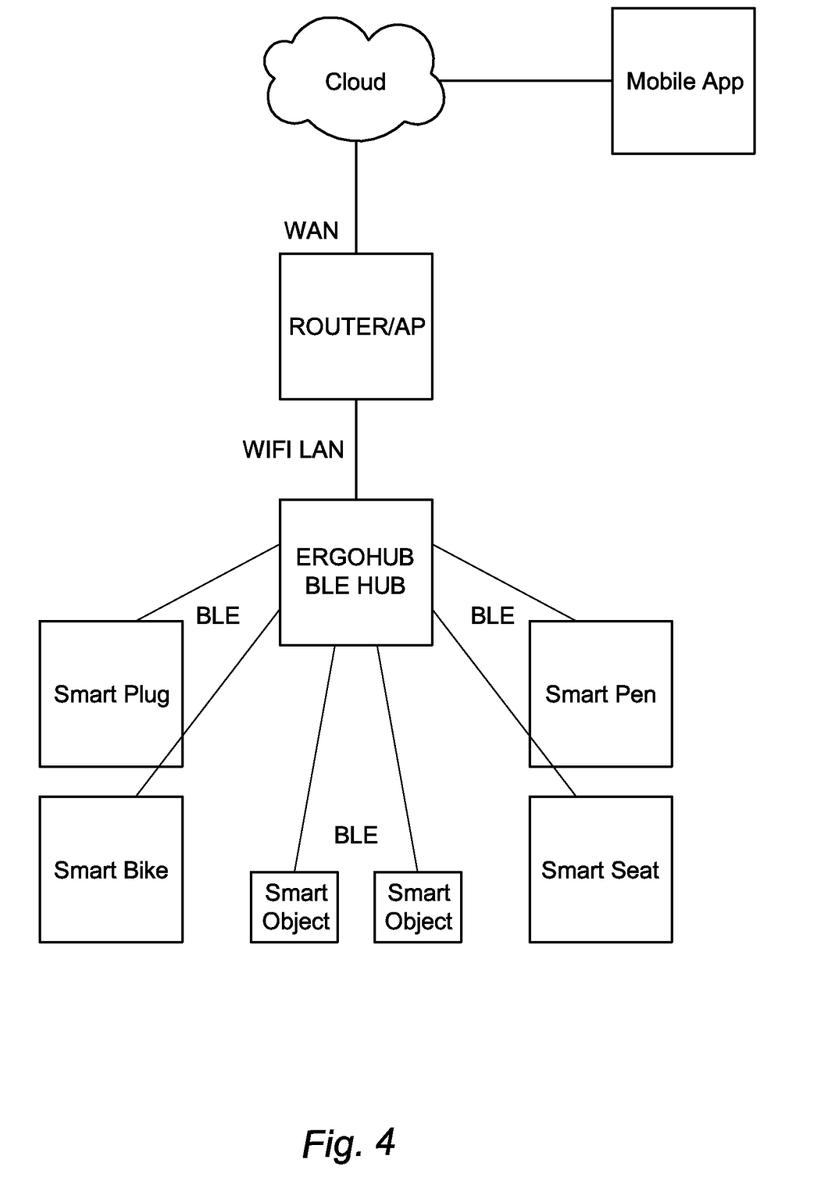
FIG. 4 is a diagram showing the smart hub process for connecting the smart hub device with multiple BLE supported peripherals used in conjunction with one embodiment of the present invention.

In addition to the above general functions, embodiments of the present invention also provide for other advanced functions. For example, the smart hub device 15 uses a BLE Gateway technology which makes the smart hub device functions as a Bluetooth gateway that allows the connection of certain supported BLE peripherals to the smart hub device. Reference to FIG. 4 shows a general flow chart that describes that interconnection process.

One functional element of the above operation of embodiments of the present invention is the collection of a set of Occupancy Data 29 (FIG. 3) associated with the usage of a specific work area 1. This is to say, a primary purpose of the embodiments is to gather that set of Occupancy Data 29 for the applicable work table 3 that includes at least one of the following, or a combination, of the following data:

1. Whether the work area 1 is occupied;
2. When the work area 1 becomes occupied or unoccupied;
3. What time the work area 1 becomes occupied;
4. What time the work area 1 becomes unoccupied;
5. Whether the user of the work area 1 is sitting or standing;
6. What time the work area 1 started and stopped sitting, if applicable;
7. What time the work area 1 started and stopped standing, if applicable;
8. Whether the work area 1 is located at a business office or a home residence;
9. The ambient temperatures for the work area 1 location at the time of any activity or lack of activity at the work area;
10. The time by day-hour-minute that there have been changes in the ambient temperature;
11. The overall occupancy rate of any specific work area by day-hour-minute;
12. The height of a work surface 5 at a specific work area by day-hour-minute;
13. The time by day-hour-minute that a work surface 5 at a specific work area 1 is adjusted upward or downward;
14. The temperature of a user that is occupying any specific work area 1;
15. Identification of any BLE peripheral that has been wirelessly connected to a specific work area 1 and data related to the time by day-hour-minute regarding the connection, time of usage, and disconnection of the BLE peripheral;
16. Time and duration of any connection of the smart hub device 15 to any Internet connection; and,
17. Time and duration of the startup of the smart hub device 15.

If such set of Occupancy Data 29 is generated within any particular embodiment of the present invention, that data is communicated between the current embodiment and either the Internet or the Cloud where the set of Occupancy Data is further analyzed and used for purposes directly or indirectly related to the present invention.

It is appreciated that the interconnection shown in FIG. 4 allows for the connection of many types of devices such as, for example, a smart pen, a smart water bottle, a smart plug, and a smart temperature sensor, or any other supported BLE peripheral. In fact, almost type of peripheral can be communicatively connected to the smart hub device 15 as long as the selected peripheral is generally BLE compatible. An example of one version of an interconnected system is shown in FIG. 4 where multiple smart objects connect to the smart hub device 15 via its BLE interface.

As noted above, one function of embodiments of the present invention is to notify the user when it is time for the user to change from a standing position to a sitting position, or change from a sitting position to a standing position. When it is determined by the processes above that a signal needs to be communicated to the user to sit or stand, FIG. 6 generally describes that notification process.

In this embodiment, the user is notified through a smart phone application installed upon the user's smart phone. The user sets this reminder via a smart phone application that transfers the selected trigger threshold to the device via the Cloud. The smart hub device 15 then reports to the server that is in operative communication with the smart hub device when the reminder threshold has been reached. That server receives the smart hub device 15 notification and sends a notification to the user's smart phone reminding the user to stand up or sit down.

It is appreciated that in yet other embodiments the signal can be communicated to the user in other ways such as light signals, sound signals, or any other signal as long as the signal selected properly notifies the user that it is time for the user to change position from sitting to standing, or from standing to sitting. For example, because the smart hub device 15 in the present embodiment has an Internet interface and is capable of various BLE smart gateway interfaces, there are various possible methods and processes that can be used to send the sit down/stand up reminder message to external Cloud services and external supported BLE peripherals. At step 5 in the flow shown in FIG. 6, for example, the software package of the smart hub device 15 can be programmed to send the reminder to a lamp to make it blink or to a supported desk height controller to actually make the desk move up and down, and so on.

In the preceding description, numerous specific details are set forth such as examples of specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication and manufacture for those of ordinary skill. The scope of the invention should be determined by any appended claims and their legal equivalents, rather than by the examples given.

Additionally, it will be seen in the above disclosure that several of the intended purposes of the invention are achieved, and other advantageous and useful results are attained. As various changes could be made in the above constructions without departing from the scope of the invention, it is intended that all matter contained in the above descriptions or shown in the accompanying drawings shall be interpreted as illustrative and not in a limiting sense.

Terms such as "proximate," "distal," "upper," "lower," "inner," "outer," "inwardly," "outwardly," "exterior," "interior," and the like when used herein refer to positions of the respective elements as they are shown in the accompanying drawings, and the disclosure is not necessarily limited to such positions. Terms such as "first," "second," and other numerical terms when used herein do not imply a sequence or order unless clearly indicated by the context.

When introducing elements or features and the exemplary embodiments, the articles "a," "an," "the" and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It will also be understood that when an element is referred to as being "operatively connected," "connected," "coupled," "engaged," or "engageable" to and/or with another element, it can be directly connected, coupled, engaged, engageable to and/or with the other element or intervening elements may be present. In contrast, when an element is referred to as being "directly connected," "directly coupled," "directly engaged," or "directly engageable" to another element, there are no intervening elements present. Other words used to describe the relationship between elements should be interpreted in a like fashion (e.g., "between" versus "directly between," "adjacent" versus "directly adjacent," etc.).

What is claimed is:

1. A system for detecting usage and position of a height adjustable work surface comprising:
    a smart hub device having a set of sensors for detecting at least two infrared signal values and one distance wherein the set of sensors comprises:
        a first sensor that detects infrared energy for detecting a first infrared value, a second sensor that detects infrared energy for detecting a second infrared value, and a third sensor for detecting a height dimension between the smart hub device and a floor;
    wherein the first sensor detects infrared energy for detecting a first infrared value, the second sensor detects infrared energy for detecting a second infrared value, and, the third sensor is a time of flight sensor for detecting a height dimension between the smart hub device and a floor; and,
    a user interface that includes at least one of either a capability for generally configuring the smart hub device for operation within a work area, a capability to connect the smart hub device to external Bluetooth peripherals, or a capability to communicate a set of occupancy data obtained by the smart hub device to another device via the Internet or the Cloud.

2. The system for detecting usage and position of a height adjustable work surface of claim 1 wherein the first infrared value is a value of the heat emitted from a human user and wherein the second infrared value is a value of an ambient infrared energy of the environment of the work area.

3. The system for detecting usage and position of a height adjustable work surface of claim 2 further comprising a software package installed within the smart hub device wherein the software package comprises:
    an algorithm for determining the presence of the human user within a range of the first sensor;
    an algorithm for determining a motion of the human user within the range of the first sensor;
    an algorithm for determining the ambient temperature of the environment of the work area; and,
    an algorithm for determining the height dimension between the smart hub device and a floor.

4. The system for detecting usage and position of a height adjustable work surface of claim 3 wherein the software package further comprises:
    a smart phone application for setting up a set of operative functions for the smart hub device;
    a Bluetooth Low Energy (BLE) Interface to operatively connect the smart hub device with at least one peripheral BLE device; and,
    wherein the smart hub device has a pairing device to initiate the BLE interface.

5. The system for detecting usage and position of a height adjustable work surface of claim 4 wherein the algorithm for determining the presence of the human user within the range of the first sensor comprises:
    a warmup period for the smart hub device in which the smart hub device is turned on and allowed to function for about 10 minutes;
    detection of the first infrared value detected by the first sensor;
    detection of the second infrared value of the second sensor;
    comparison of the first infrared value with the second infrared value to identify any difference between the first infrared value and the second infrared value; and,
    concluding that there is presence of a human user within the range of the first sensor when the difference between the first infrared value and the second infrared value is larger than the upper threshold and the motion detection algorithm of the first sensor has detected motion.

6. The system for detecting usage and position of a height adjustable work surface of claim 5 further comprising:
    an initial threshold calculation algorithm ran while the user remains outside a detection range of the first sensor that includes:
        collecting about a thirty second interval of any differences between the first infrared value and the second infrared value;
        calculating the average of those infrared value differences across the thirty second interval; and,
        establishing the average of those infrared value differences as a baseline from where the upper and lower threshold values are calculated by adding an empirically found fixed value to this baseline to indicate the absence of the human user.

7. The system for detecting usage and position of a height adjustable work surface of claim 6 wherein the software package further comprises an algorithm for detecting motion of a human user by comparison of a sequential set of signals from the first sensor to identify any sequential difference between the value of a first of the set of sequential signals and a signal immediately after the first of the set of sequential signals to conclude that there is motion by the human user when such a sequential difference exists.

8. The system for detecting usage and position of a height adjustable work surface of claim 7 wherein the software package comprises an algorithm to determine if the human user is one of either sitting or standing in a work area by:
  collecting signals from the third sensor to determine the height dimension from the smart hub device to the floor; and,
  comparing the height dimension to a customizable set of height parameters that determine whether the human user is one of either sitting or standing.

9. The system for detecting usage and position of a height adjustable work surface of claim 8 wherein the customizable set of height parameters includes a first position value of about 70 cm to show the human user is sitting and a second position value of about 100 cm to show the human user is standing.

10. The system for detecting usage and position of a height adjustable work surface of claim 9 further comprising a position change notification to the human user to change position to one of either sitting or standing when a customizable predetermined position adjustment time interval has been reached when the human user should one of either change from a sitting position to a standing position or change from a standing position to a sitting position.

11. The system for detecting usage and position of a height adjustable work surface of claim 10 wherein the position change notification is communicated to the human user by one of either a smartphone communication, an optical signal communication, an audible signal communication, or a vibratory signal communication.

12. The system for detecting usage and position of a height adjustable work surface of claim 9 wherein the set of occupancy data is obtained by the software package and includes at least one of the following data:
  whether the work area is occupied;
  when the work area becomes one of either occupied or unoccupied;
  what time the work area becomes occupied;
  what time the work area becomes unoccupied;
  whether the human user of the work area is in one of either a sitting position or a standing position;
  what time the human user changed from the sitting position or the from the standing position;
  what interval time the human user was one of either in the sitting position or in the standing position;
  whether the work area is located at one of either a business office or a home office;
  the ambient temperatures of the work area location at the time of one of either an activity or a lack of activity at the work area;
  the time by day-hour-minute that there have been changes in the ambient temperature;
  the overall occupancy rate of the work area by day-hour-minute;
  the height dimension between the smart hub device and the floor by day-hour-minute;
  the time by day-hour-minute that the height dimension changed;
  the temperature of the human user occupying the work area;
  identification of any BLE peripheral that has been paired to the smart hub device, the time by day-hour-minute when any data is communicated between the smart hub device and the BLE peripheral, the time by day-hour-minute the connection between the smart hub device and the BLE peripheral lasted, and the time by day-hour-minute when the smart hub device was unpaired from the BLE peripheral;
  time and duration of any connection of the smart hub device to any Internet connection; and,
  time and duration of the startup of the smart hub device.

13. The system for detecting usage and position of a height adjustable work surface of claim 12 wherein at least one of the set of occupancy data is communicated between the smart hub device and another electronic device via one of either the Internet or the Cloud, and wherein the smart hub device is powered through a USB connection port incorporated into the smart hub device.

14. A system for detecting usage and position of a height adjustable work surface comprising:
  a smart hub device that includes:
    a set of sensors for determining the presence of a human user at a work area and for determining whether the user is one of either sitting or standing at the work area, wherein the set of sensors comprises a first sensor that is an infrared device for detecting the presence of the heat generated by the human user disposed at the work area, a second sensor that is an infrared device capable of detecting an ambient infrared energy value of the location in which the work area is disposed, and a third sensor capable of determining a height dimension between the smart hub device and a floor;
    a software package for the general operation of the smart hub device wherein the software package is capable of intercommunication with at least one of either a set of Bluetooth capable peripheral devices or a device capable of communication to the Cloud of a set of user occupancy data obtained by the smart hub device;
  wherein the smart hub device is powered through a USB connection port incorporated into the smart hub device;
  wherein the smart hub device includes a pairing button to initiate communicative pairing with a Bluetooth device;
  wherein the smart hub device includes a reset control capable of rebooting the operation of the smart hub device; and,
  wherein the smart hub device includes an LED indicator positioned on the smart hub device wherein the indicator provides a signal that the smart hub device is in communication with a Bluetooth device.

* * * * *